(12) United States Patent
Stern et al.

(10) Patent No.: US 7,116,223 B2
(45) Date of Patent: Oct. 3, 2006

(54) SYSTEMS, METHODS, AND APPARATUS FOR MONITORING A CONTAINER ASSOCIATED WITH AN ITEM

(75) Inventors: Edith H. Stern, Yorktown Heights, NY (US); David P. Greene, Ossining, NY (US); Philip Shi-lung Yu, Chappaqua, NY (US); Barry E. Willner, Briarcliff Manor, NY (US); Robert E. Chapman, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 767 days.

(21) Appl. No.: 10/040,231

(22) Filed: Jan. 2, 2002

(65) Prior Publication Data
US 2003/0122670 A1    Jul. 3, 2003

(51) Int. Cl.
*G08B 13/14* (2006.01)
(52) U.S. Cl. ............... 340/568.1; 340/572.1; 340/3.1
(58) Field of Classification Search ........... 340/568.1, 340/568.2, 568.7, 572.1, 540, 309.4, 3.1
See application file for complete search history.

(56) References Cited

U.S. PATENT DOCUMENTS

| | | | | |
|---|---|---|---|---|
| 4,750,197 A * | 6/1988 | Denekamp et al. | ...... | 455/404.2 |
| 4,899,839 A | 2/1990 | Dessertine et al. | ...... | 177/25.19 |
| 5,016,172 A | 5/1991 | Dessertine | ............. | 364/413.02 |
| 5,798,694 A * | 8/1998 | Reber et al. | ................ | 340/540 |
| 5,831,531 A | 11/1998 | Tuttle | ......................... | 340/572 |
| 5,859,415 A * | 1/1999 | Blomqvist et al. | .......... | 235/384 |
| 5,971,594 A | 10/1999 | Sahai et al. | ............ | 364/479.12 |
| 6,507,275 B1 * | 1/2003 | Romano et al. | ....... | 340/309.16 |
| 6,578,199 B1 * | 6/2003 | Tsou et al. | ................... | 717/178 |
| 7,015,814 B1 * | 3/2006 | Ireland et al. | ........... | 340/572.1 |

OTHER PUBLICATIONS

Daily Vidette Online Edition, "Invention Lets Your Trash Can Do The Shopping" (1999).
Douglas Hanks III, Washington Post, "Wired! But Why?," p. F01 (May 16, 2001).
Amy Cohen, Mpulse—A Cooltown Magazine, "Through the Handheld Looking Glass" (Aug. 10, 2001).

* cited by examiner

*Primary Examiner*—Phung T. Nguyen
(74) *Attorney, Agent, or Firm*—Buckley, Maschoff & Talwalkar LLC; Stephen C. Kaufman

(57) ABSTRACT

Systems and methods are provided to monitor a container associated with an item. According to one embodiment, an indication that a container has been opened is received. For example, the container may transmit a signal when a person opens the container to access an item. Based on the received indication, ownership of the item may be transferred and/or another item may be provided (e.g., to the person who opened the container). According to other embodiments, item quality information, item warranty information, and/or security information are determined based on the received indication. According to still other embodiments, a sender receives a notification based on the indication or the indication is recorded as an acceptance of an agreement. In yet another embodiment, the indication is used to verify that the container was opened in accordance with an item requirement.

14 Claims, 16 Drawing Sheets

| CONTAINER IDENTIFIER 1602 | PARTY IDENTIFIER 1604 | STATUS 1606 | DATE AND TIME 1608 |
|---|---|---|---|
| C101-01 | P101 | OPENED | 12:45 PM 05/01/03 |
| C101-02 | P101 | NOT OPENED | NONE |
| C102 | P102 | OPENED | 12:55 PM 05/01/03 |

SYSTEMS, METHODS, AND APPARATUS FOR MONITORING A CONTAINER ASSOCIATED WITH AN ITEM

FIELD

The present invention relates to systems and methods for monitoring a container associated with an item.

BACKGROUND

It is usually easy to determine when an item is physically provided to a person. For example, a merchant or manufacturer can typically determine when the person physically takes possession of the item (e.g., by monitoring when the person removes the item from a store or when the item is delivered to the person). As a result, ownership of the item is commonly transferred to the person at this time. That is, ownership of the item may be transferred when the person takes the item from a store or when the item is shipped to (or received by) the person. Moreover, the person commonly provides payment for the item at this time (e.g., the person may provide payment via a credit card account when the item is shipped to his or her home address).

A number of disadvantages arise, however, when ownership is transferred in this way. Consider, for example, an item that is consumed by a person on a regular basis. Examples of such consumable items include paper supplies and toner cartridges used by a printer, batteries, disposable contact lenses, and prescription medicines. In this case, the person may only be able (or willing) to provide payment for a limited amount of the consumable item (e.g., a one-month supply of disposable contact lenses)—even though he or she will eventually need more than limited amount.

As a result, the consumable item may need to be frequently provided to the person. For example, the person may need to frequently visit a merchant's store or the consumable item may need to be frequently delivered to the person. Such an approach may be inconvenient, time consuming, and inefficient for the person and/or a merchant. Moreover, a merchant, distributor, and/or manufacturer may need to store a significant amount of the consumable item (e.g., increasing the overhead costs and risk associated with inventory). A merchant may also find that the person has decided to make future purchases of the item from another merchant.

Other problems can also arise if a merchant only knows when an item is physically provided to a person. One such problem is that the merchant cannot accurately predict when the person will need an additional amount of the item. For example, a merchant may know that three toner cartridges were delivered to a person at the beginning of the year. The merchant will not know, however, when the person has used two of the three cartridges (e.g., and would therefore be interested in purchasing additional cartridges).

Another problem is that the quality of an item may depend on factors other than when the item was manufactured and/or delivered to a person. Consider, for example, film used by photographers. In this case, the quality of the film will depends on the date it was manufactured (e.g., and the manufacturer may therefore indicate an appropriate "sell by" or "use by" date on a package of film). The quality may also depend, however, on when a person opens a sealed package of film. There is no efficient way for a merchant or manufacturer to take this information into account (e.g., in order to notify a person that the quality of his or her film may not be acceptable).

Still another problem is that warranty information (e.g., the effective or expiration date of a warranty, a return policy, or a guarantee) is based on when an item was provided to a person. For example, an item's warranty may expire sixty days after a person receives the item—even if the person does not use the item until fifty days after the item was received.

Other problems include a limited amount of security information that is available (e.g., a merchant will not know when an unauthorized person accesses an item en route to a purchaser) and a limited amount of information that is available to a person who sends an item to a friend (e.g., a sender may know that FEDERAL EXPRESS® left a package for the friend on Monday but will not know when the friend actually opens the package). A similar problem arises with respect to agreements that become effective when a person opens a package (e.g., a software "shrink-wrap" license agreement). In this case, a manufacturer may not know when the person has accepted the agreement.

Moreover, known methods of determining information other than the time when an item is physically provided to a person can be inefficient and expensive. For example, U.S. Pat. No. 5,971,594 entitled "Medication Dispensing System" discloses a system that lets a central monitoring facility determine if a person has not received medication within a prescribed time. The complexity of the system, however, requires a dedicated dispensing device including a local programmable controller and a modem.

SUMMARY

To alleviate problems inherent in the prior art, the present invention introduces systems and methods to monitor a container associated with an item.

According to one embodiment, an indication is received that the container has been opened. It is then arranged for ownership of the item to be transferred based on the indication.

According to another embodiment, an indication is received that a container has been opened. It is then arranged for another item to be provided based on the indication.

According to another embodiment, an indication is received that a container has been opened. Item quality information, item warranty, and/or security information are then determined based on the indication.

According to another embodiment, an indication is received that a container has been opened. It is then arranged for a sender associated with the container to receive a notification based on the indication.

According to another embodiment, an indication is received that a container has been opened. The indication is then recorded as an acceptance of an agreement associated with the item.

According to still another embodiment, a signal is received indicating that a container has been opened. According to this embodiment, the signal is generated by a transmitting device that does not transmit a signal when the container is subsequently re-opened. It is then verified that the container was opened in accordance with an item requirement.

According to yet another embodiment, a disposable package is provided to a consumer without receiving payment in exchange for a consumable item contained within the package. An indication is then received that the package has been opened, and it is arranged for the consumer to provide payment in exchange for the consumable item based on the indication.

One embodiment comprises: an enclosure; and a transmitting device adapted to transmit a signal when the enclosure is opened, wherein the transmitting device does not transmit a signal when the enclosure is subsequently re-opened.

Another embodiment comprises: means for receiving an indication that a container has been opened; and means for arranging for ownership of the item to be transferred based on the indication.

Another embodiment comprises: means for receiving an indication that a container has been opened; and means for arranging for another item to be provided based on the indication.

Another embodiment comprises: means for receiving an indication that a container has been opened; and means for determining at least one of item quality information, item warranty information, and security information based on the indication.

Another embodiment comprises: means for receiving an indication that a container has been opened; and arranging for a sender to receive a notification based on the indication.

Still another embodiment comprises: means for receiving an indication that a container has been opened; and recording the indication as an acceptance of an agreement associated with the item.

Yet another embodiment comprises: means for receiving a signal indicating that the container has been opened, the signal being generated by a transmitting device that does not transmit a signal when the container is subsequently re-opened; and means for verifying that the container was opened in accordance with an item requirement.

Another embodiment comprises: means for providing a disposable package to a consumer without receiving payment in exchange for the consumable item; means for receiving an indication that the package has been opened; and arranging for the consumer to provide payment in exchange for the consumable item based on the indication.

With these and other advantages and features of the invention that will become hereinafter apparent, the invention may be more clearly understood by reference to the following detailed description of the invention, the appended claims, and the drawings attached herein.

DETAILED DESCRIPTION

Embodiments of the present invention are directed to systems and methods to monitor a container associated with an "item." As used herein, the word "item" may refer to anything that may be enclosed by, or otherwise associated with, a container. An item may be, for example, a consumer item or a consumable item (e.g., paper supplies and toner cartridges used by a printer). An item may also be associated with an energy supply (e.g., a battery), food, or medical supplies (e.g., disposable contact lenses, bandages, or prescription medicines). An item may also be associated with information, such as a software program, entertainment information (e.g., a movie), text information, audio information, image information, and an information storage item (e.g., a blank DVD). Other examples of items include regulated items (e.g., tobacco products) and financial items (e.g., bank checks). Moreover, an item may be in the form of a solid, a liquid (e.g., perfume or bottled water), or a gas (e.g., nitrous oxide used by a dentist).

In addition, the word "container" may refer to, for example, something that is altered when an associated item is accessed. For example, a container may be a package (e.g., a box) having a lid that a person opens to access an item inside the package. A container may also be, for example, an envelope, a can, or a bottle that is opened by a person. As another example, a container may be wrapper (e.g., a plastic wrapper around a package).

Note that an item does not need to located entirely (or even partially) within a container. For example, a container may be a label or a tag that a person removes (e.g., a tag on a dress that is removed when the dress is worn). Similarly, a container may be a tie that prevents an item from being used. For example, a hospital gown may have a small tie that must be removed before a patient can wear the gown.

Monitoring System Overview

Figure 1:
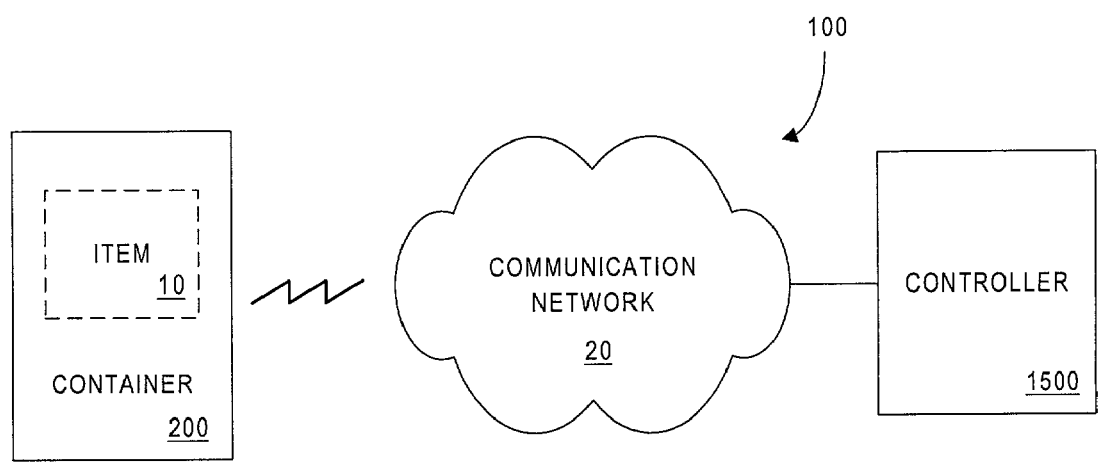
FIG. 1 is a block diagram overview of a monitoring system according to some embodiments of the present invention.

Turning now in detail to the drawings, FIG. 1 is a block diagram overview of a monitoring system 100 according to some embodiments of the present invention. The monitoring system 100 includes a controller 1500 in communication with a container 200 (e.g., the controller 1550 may receive information from the container 200). As used herein, devices (such as the controller 1500 and the container 200) may communicate via a communication network 20, such as a Local Area Network (LAN), a Metropolitan Area Network (MAN), a Wide Area Network (WAN), a proprietary network, a Public Switched Telephone Network (PSTN), a Wireless Application Protocol (WAP) network, a wireless LAN (e.g., in accordance with the Institute of Electrical and Electronics Engineers 802.11 standard), an Infrared Radiation (IR) network, or an Internet Protocol (IP) network such as the Internet, an intranet or an extranet.

For example, the controller 1500 may receive information generated by a remote container 200 via Bluetooth technology. Bluetooth technology allows a wide range of computing and telecommunication devices to be interconnected via wireless connections. Specifications and other information regarding Bluetooth technology are available at the Bluetooth Web site www.bluetooth.com. In embodiments utilizing Bluetooth technology, communicating devices may be equipped with a microchip transceiver that transmits and receives information in a frequency band of 2.45 GHz (with some variation of bandwidth in different countries). Connections may be point-to-point or multipoint over a maximum range, such as ten meters. Embodiments using Bluetooth technology may require the additional use of one or more communication stations (e.g., a local communication station may be placed in a party's home, and this communication station may relay information from a container 200 to the controller 1500).

Although a single controller 1500 is shown in FIG. 1, any number of controllers 1500 may be included in the monitoring system 100. Similarly, any number of containers 200, or any of the other devices described herein, may be included in the monitoring system 100 according to embodiments of the present invention.

Note that the devices shown in FIG. 1 need not be in constant communication. For example, the controller 1500 may receive information from a container 200 on an as-needed or periodic basis. Similarly, the controller 1500 might communicate with a container 200 only when the container 200 is located near the controller 1500 or another device.

Container

Figure 2:
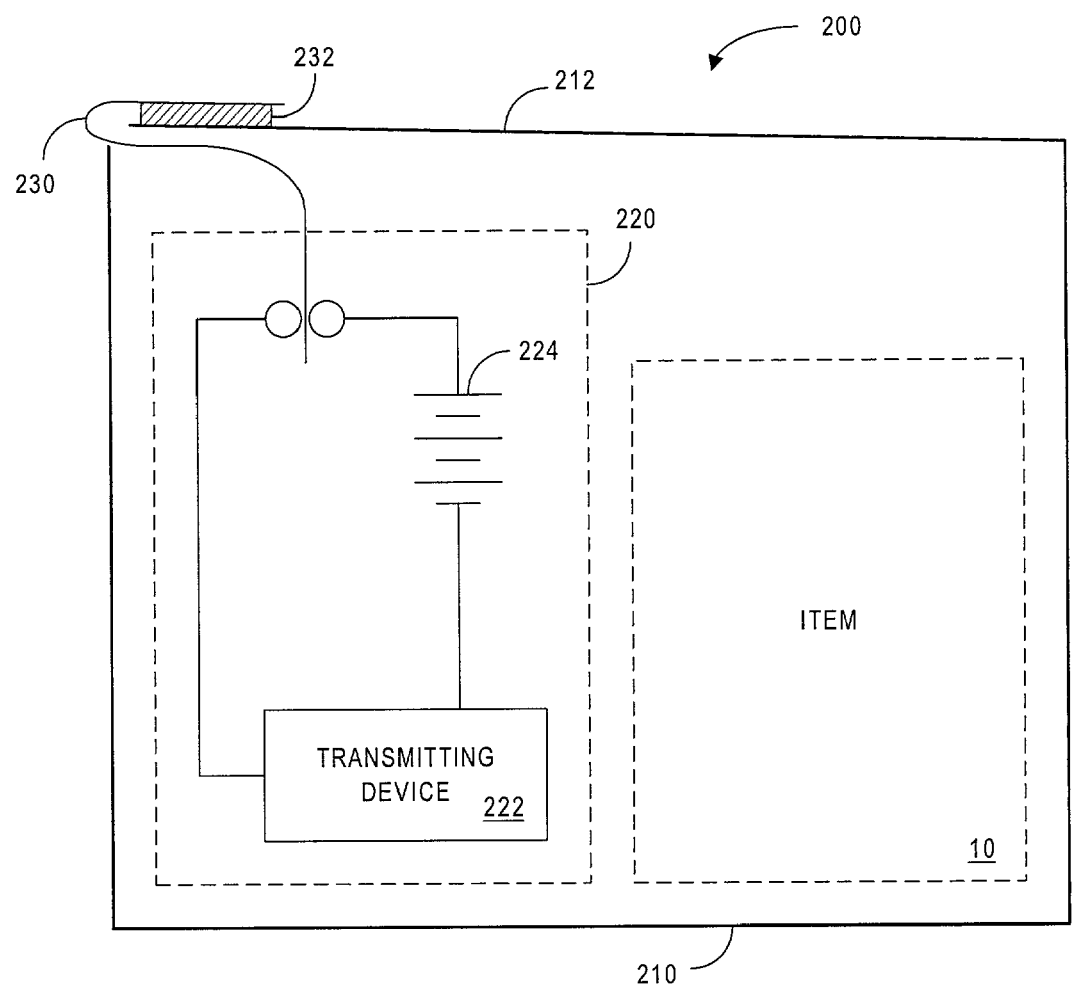
FIGS. 2 and 3 illustrate a container according to one embodiment of the present invention.

FIG. 2 illustrates a container 200 according to one embodiment of the present invention. In particular, the container 200 includes an enclosure 210 that contains an item 10. The enclosure 210 also includes a lid 212 than can be opened or closed (the lid 212 shown in FIG. 2 is closed).

The container 200 also includes a detection circuit 220 that determines when the container has been opened 200. The detection circuit 220 may, for example, be attached to the inside or outside of the container 200—or may be embedded within the a container wall. The detection circuit 220 includes a transmitting device 222, such as a radio transmitter, and a power source 224. A conductive path from the power source 224 to the transmitting device 222 is blocked by a non-conducting element 230, such as a flexible strip of plastic or similar material. As long as the non-conducting element 230 blocks the path from the power source 224 to the transmitting device 222, the transmitting device 222 does not generate a signal. According to one embodiment, The non-conducting element 230 is attached to the lid 212. For example, the non-conducting element 230 may be attached to the outer surface of the lid 212 via an adhesive material 232 (e.g., a glue) or a fastener (e.g., a staple). The non-conducting element 230 may also be embedded within the lid 212 or may actually be part of the lid 212 itself (e.g., it may be an extension of the lid 212). The non-conduction element 230 may be routed around the edge of the lid 212 (as shown in FIG. 2) or may pass through a hole in the lid 212. According to another embodiment, the non-conducting element is attached to the inner surface of the lid 212. In this case, another portion of the enclosure 210 may be sealed by a manufacturer after the item 10 is placed inside.

Figure 3:
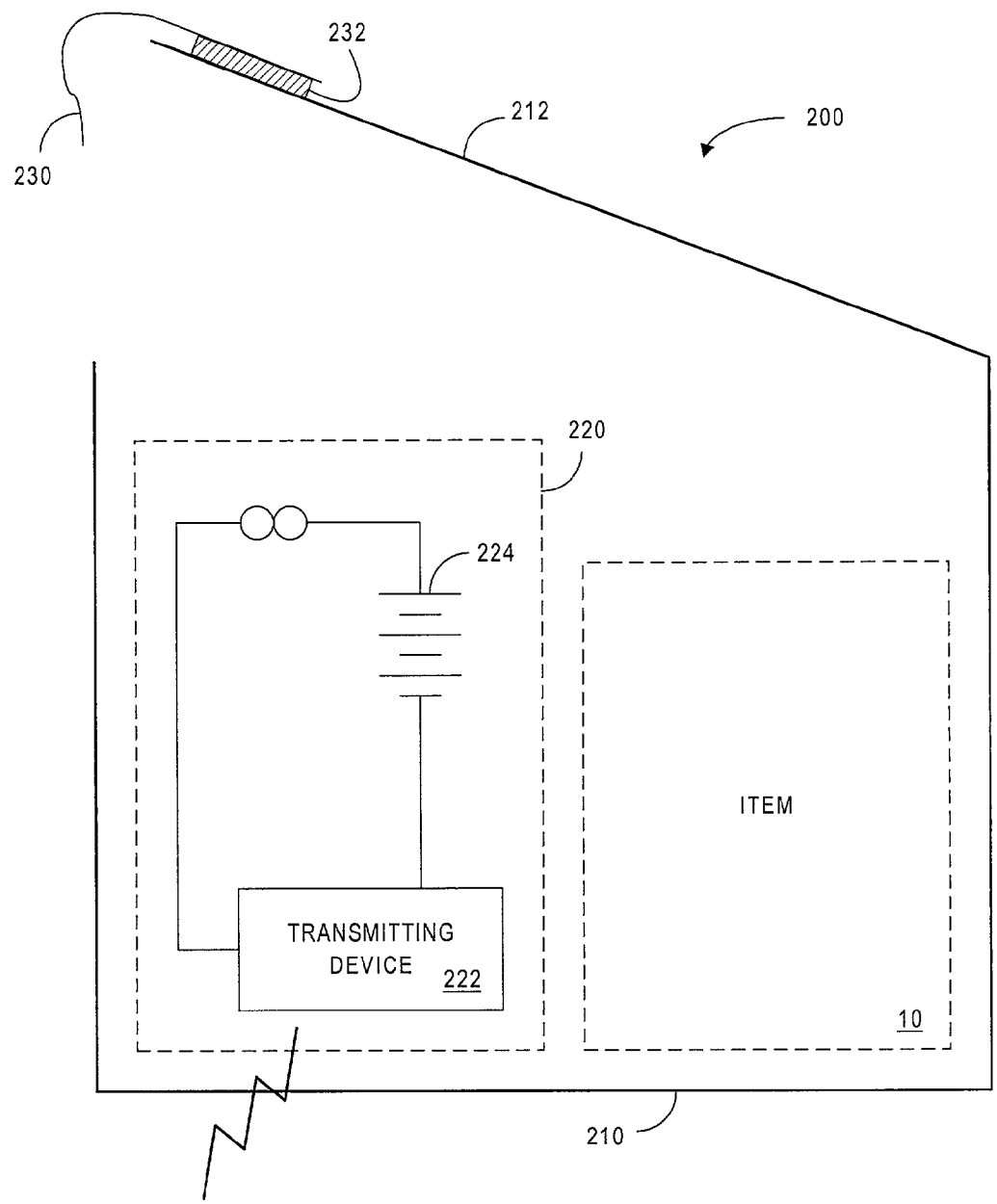

Consider now FIG. 3, which illustrates the container 200 after the lid 212 has been opened (e.g., to allow accesses the item 10). As a result of opening the lid 212, the non-conducting element 230 has been moved and the path from the power source 224 to the transmitting device 222 is no longer blocked. The transmitting device 222 senses and/or uses the current that is thereby provided and generates a signal (e.g., a radio signal) that can be detected by another device. According to one embodiment, a spring or some other element urges two contacts together when the non-conducting element 230 is removed to complete the path from the power source 224 to the transmitting device 222.

Figure 4:
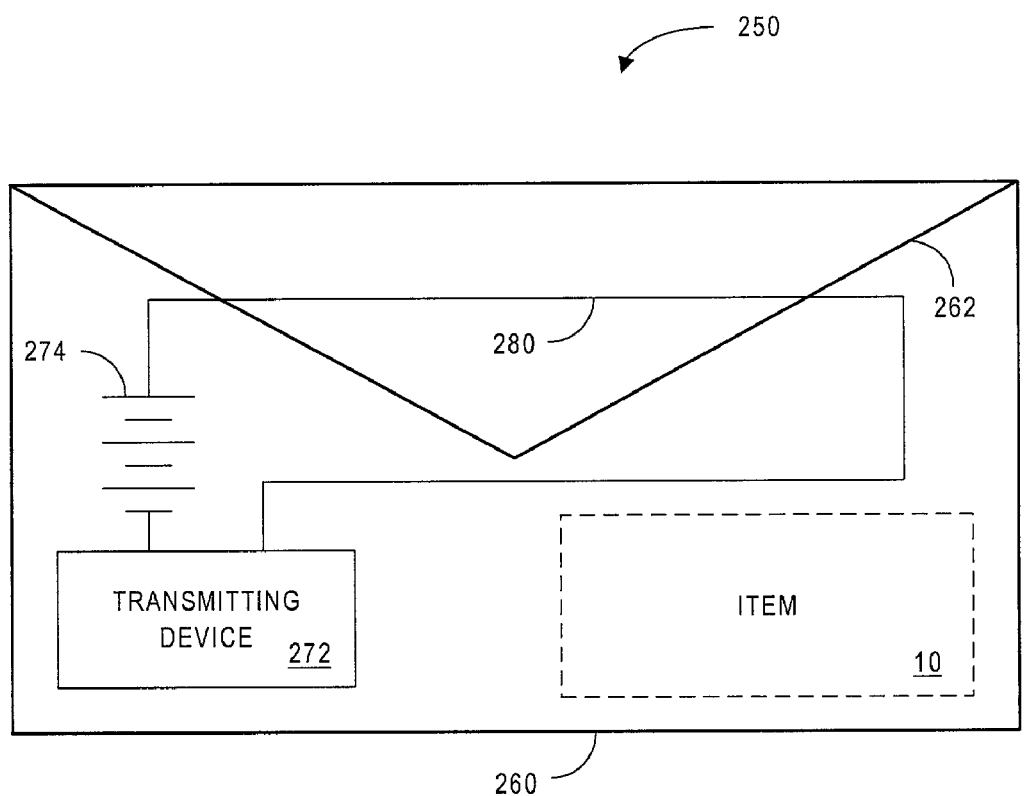
FIGS. 4 and 5 illustrate a container according to another embodiment of the present invention.

FIG. 4 illustrates a container 250 according to another embodiment of the present invention. In this case, the item 10 is contained within an envelope 260. The envelope 260 includes a flap 262 that may be opened or closed (the flap 262 shown in FIG. 4 is in closed). According to one embodiment, the flap 262 is associated with a "tear here" strip that a person removes to access the item 10.

The container 250 also includes a detection circuit that determines when the container 250 has been opened. The detection circuit may, for example, be attached to the inside or outside of the container 250—or may be embedded within a container wall. The detection circuit includes a transmitting device 272, such as a cellular device, a power source 274, and a conductive path from the power source 274 to the transmitting device 272 (e.g., via a thin wire embedded in the envelope 206). As long as this path is maintained, the transmitting device 272 does not generate a signal. According to one embodiment, a number of these paths are included in the container 250.

Figure 5:
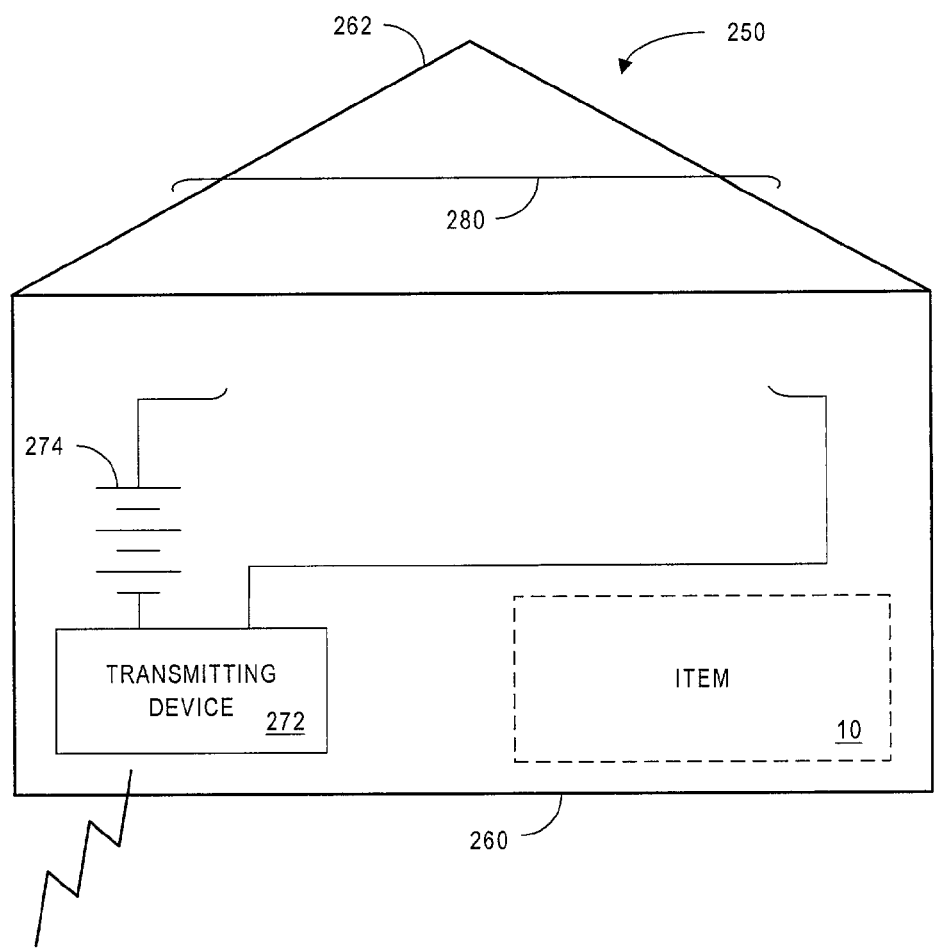

Consider now FIG. 5, which illustrates the container 250 after the flap 262 has been opened (e.g., to allow accesses the item 10). As a result of opening the flap 262, the path from the power source 274 to the transmitting device 272 has been destroyed (e.g., the thin wire was broken). This is sensed by the transmitting device 272, which in turn generates a signal (e.g., by dialing a pre-determined telephone number via a cellular network and transmitting the signal). Note that the transmitting device 272 may use power from a source other than the power source 274 to generate the signal. According to another embodiment, the transmitting device 272 uses power from the power source 274 to generate the signal (e.g., via a portion of the detection circuit not illustrated in FIGS. 4 and 5).

Note that the containers 200, 250 shown in FIGS. 2 through 5 may output a signal for a pre-determined period of time and/or until there is not enough power left to operate the respective transmitting devices 222, 272. Also note that, in these embodiments, the signal is not terminated when the containers 200, 250 are closed. Moreover, additional signals are not generated when the containers 200, 250 are subsequently re-opened.

FIGS. 2 through 5 illustrate only some of the many containers that may be used in accordance with the present invention. Other types of containers may be associated with wrappers, bags, bottles, cans, labels, tags, and/or ties. Moreover, other types of detection circuits may be associated with photosensitive devices (e.g., to detect light that enters a package when it is opened), pressure sensitive devices (e.g., to detect when a pressurized can is opened), temperature sensitive devices, and/or flexible printed circuit board devices (e.g., similar to those associated with disposable wireless telephones). According to some embodiments, a container is able to receive information from other devices (e.g., from other containers and/or a controller 1500). For example, a container may only transmit a signal if a predetermined number of other containers are present (e.g., if less than five other containers are within an effective communication range).

Another Monitoring System

Figure 6:
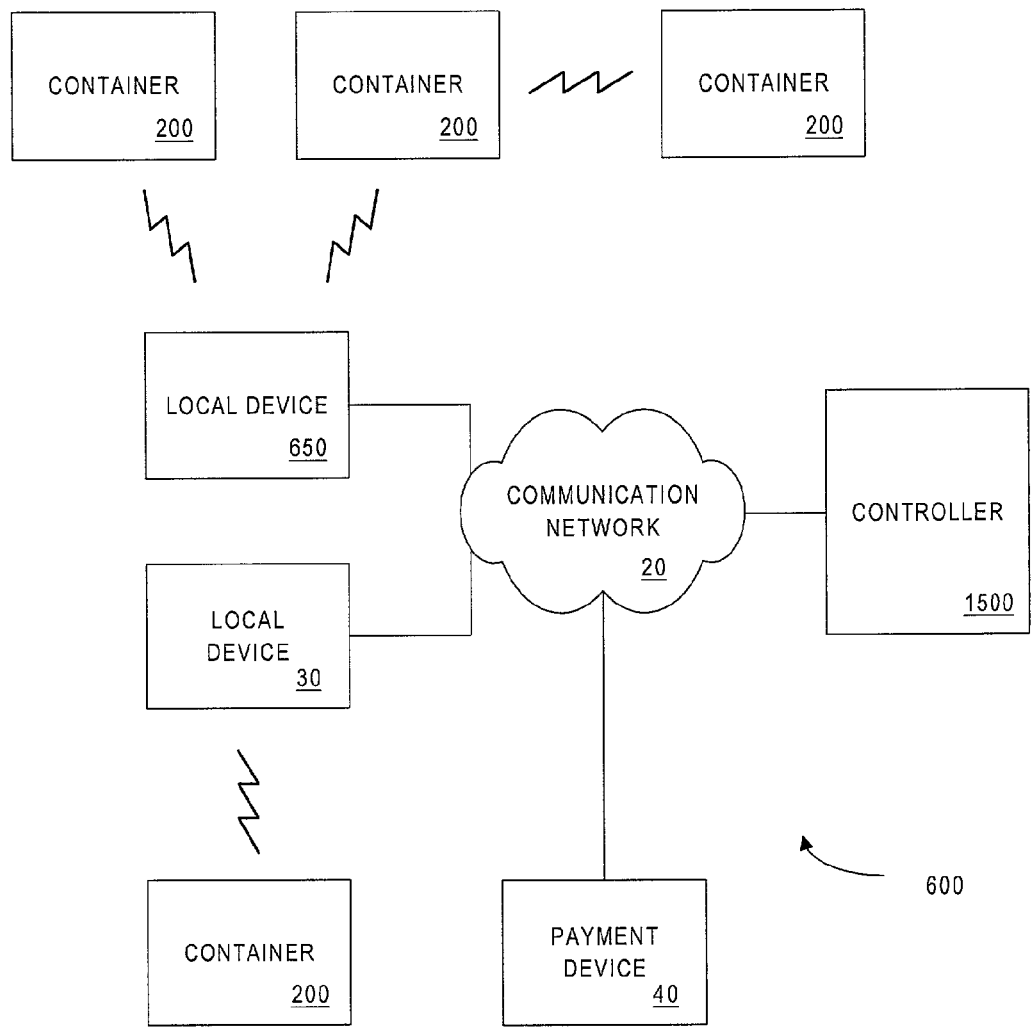
FIG. 6 is a block diagram overview of a monitoring system according to another embodiment of the present invention.

FIG. 6 is a block diagram overview of a monitoring system 600 according to another embodiment of the present invention. As before, the monitoring system 600 includes a controller 1500 that communicates with a number of containers 200 (e.g., by receiving information from a number of containers 200) via a communication network 20. According to this embodiment, however, a container 200 transmits information to the controller 1500 via a local device 30 (e.g., a Bluetooth device installed inside a printer that receives information from paper supply and toner cartridge containers located near the printer). Note that the controller 1500 may communicate with a number of local devices 30 (e.g., associated with one or more parties), and that a local device 30 may communicate with a number of containers 200. Also note that, according to some embodiments, containers 200 may communicate with each other (e.g., to determine how many other containers 200 are present).

The monitoring system 600 also includes a payment device 40 that may be used to arrange for a party to provide payment in exchange for an item associated with a container 200. The payment device 40 may be, for example, associated with a credit card account, a debit card account, a bank account device, and/or a digital payment protocol.

According to one embodiment, a container 200 transmits a signal to a local device 30 when it is opened by a party. The local device 30 relays this information to the controller 1500, which in turn arranges for payment to be provided in exchange for an item via the payment device 40.

Monitoring System Method—Transfer of Ownership

Figure 7:
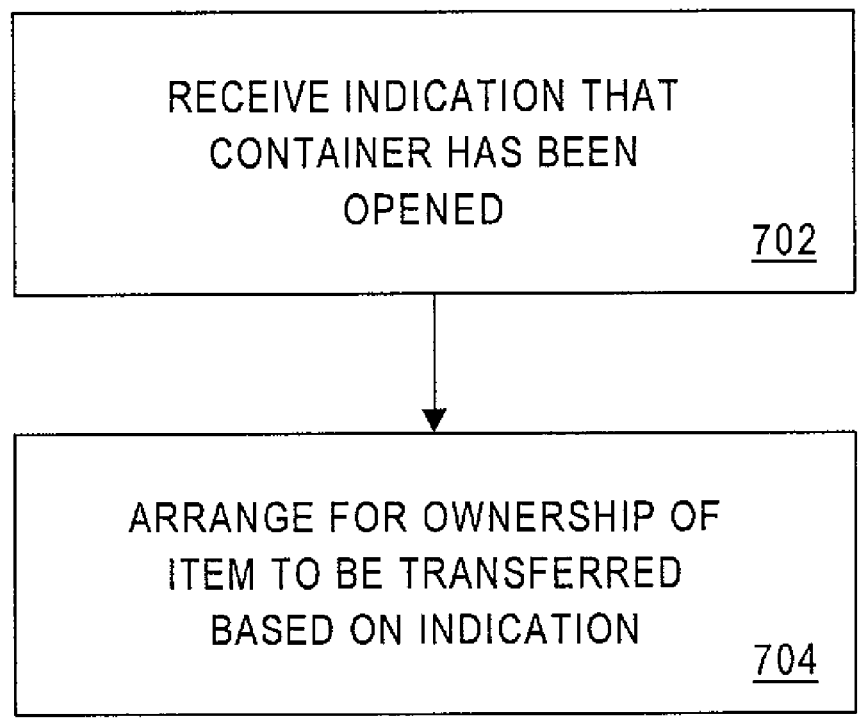
FIG. 7 is a flow chart of a method for transferring ownership of an item according to some embodiments of the present invention.

FIG. 7 is a flow chart of a method according to some embodiments of the present invention. The flow charts in FIG. 7 and the other figures described herein do not imply a fixed order to the steps, and embodiments of the present invention can be practiced in any order that is practicable. The method shown in FIG. 7 may be performed, for example, by the controller 1500.

At 702, an indication is received that a container has been opened. For example, a person may open a container to access an item associated with the container (e.g., the person may open a sealed box containing the item). As a result of being opened, the container may transmit a signal to a local device 30, which in turn relays the information to the controller 1500 via a communication network 20. According to another embodiment, the controller 1500 receives the signal directly from the container (e.g., and not via the local device 30). According to another embodiment, the controller 1500 receives the signal from the container via a transmission over a cellular network.

The received indication may include, for example, a container identifier (e.g., a unique code associated with a particular container). The indication may also include, for example, an item identifier (e.g., associated with a particular item). According to another embodiment, the indication includes a container or item category (e.g., indicating that "a package of 8½ by 11 inch paper" has been opened). The item category may be, for example, associated with the item's Universal Product Category (UPC) code.

The received indication may also include a party identifier (e.g., associated with the person who opened the container or a party who is responsible for providing payment in exchange for the item). According to some embodiments, the received indication includes a date and time (e.g., indicating when the container was opened), a location identifier (e.g., indicating where the container was opened), and/or a payment identifier. Note that some of the information in the received indication may be generated by the local device 30 (e.g., as opposed to the container itself).

At 704, it is arranged for ownership of the item to be transferred based on the received indication. For example, ownership may be transferred to the person who opened the container. Ownership may also be transferred to a party associated with the person who opened the container. For example, ownership of the item may be transferred to the employer of the person who opened the container.

According to one embodiment, "transferring ownership" simply means that a party provides payment based on when a container is opened (e.g., regardless of who legally owns the item at various points in time). For example, the controller 1500 may communicate with the payment device 40 to arrange for the person who opened the container to provide payment. Note that the ownership transferred at 704 may also be associated with, for example, a purchase, a license (e.g., of a software program), a loan, or a rental of the item.

According to one embodiment, the container (and the item associated with the container) is provided to a party without receiving payment in exchange for the item. That is, payment for the item is deferred until the container is opened. To secure the item, however, the party may provide security deposit information (e.g., to reduce the risk of people fraudulently receiving items). The security information may be a payment identifier (e.g., a credit card number, a debit card number, a bank account number, or digital payment protocol information) or an address associated with the party (e.g., a person's home address).

By way of example, consider Alice who wears disposable contact lenses. Alice provides her credit card number to a merchant, and the merchant delivers fifty containers of disposable contact lenses to Alice's home. Each container includes ten dollars worth of lenses (i.e., the fifty containers are worth five hundred dollars), but Alice does not provide any payment when she receives the containers. Instead, each time she opens a container, the container transmits a signal that is received by the merchant. When the merchant receives the signal, ten dollars is charged to Alice's credit card account. In this way, the merchant can provide a single large shipment of lenses to Alice—even though she is not able (or willing) to provide payment for the entire amount when she receives the shipment.

Monitoring System Method—Providing Another Item

Figure 8:
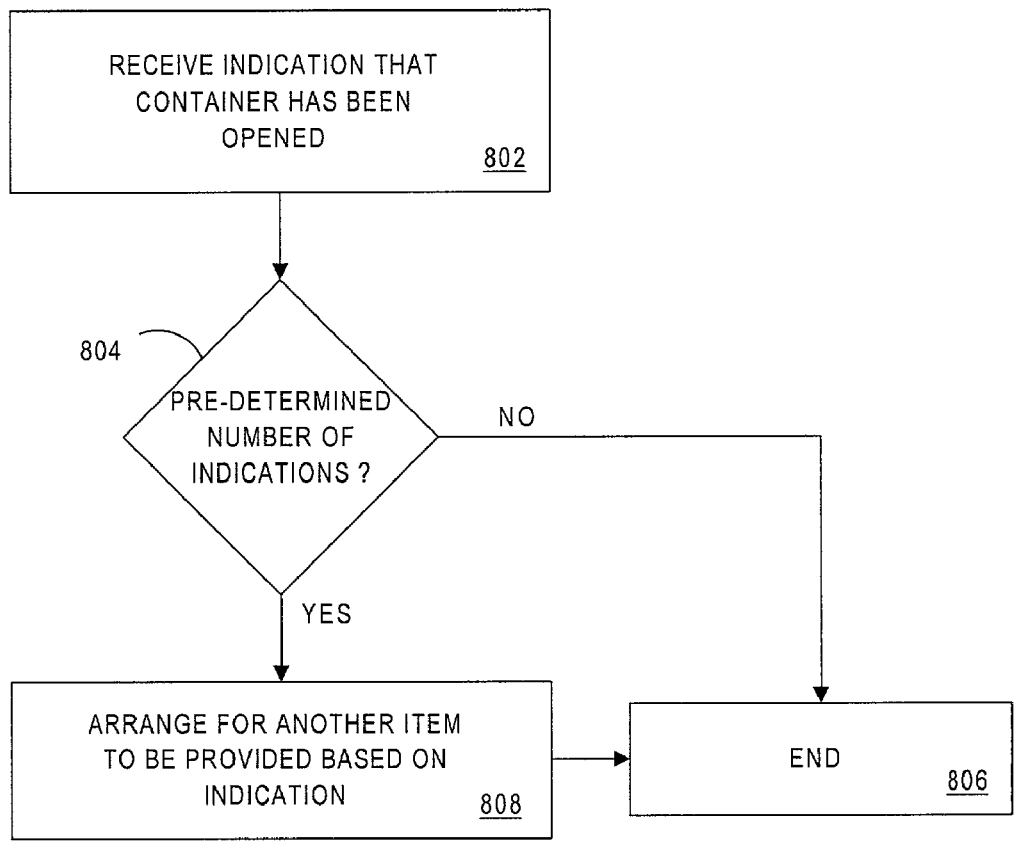
FIG. 8 is a flow chart of a method for providing another item according to some embodiments of the present invention.

FIG. 8 is a flow chart of a method for providing another item according to some embodiments of the present invention. The method shown in FIG. 8 may be performed, for example, by the controller 1500.

At 802, an indication is received that a container has been opened (e.g., when a person opens the container to access an item). As a result of being opened, the container transmits a signal that is received by the controller 1500. The received indication may include, for example, a container identifier, an item identifier, and/or an item category. Note that the indication may also include any of the other information described with respect to FIG. 7.

If a pre-determined number of indications have not been received at 804, the process ends at 806. If a pre-determined number of indications have been received, it is arranged for another item to be provided at 808. For example, a person who purchases five toner cartridges may only receive additional toner cartridges after four indications are received by the controller 1500 (e.g., indicating that the person only has one un-opened toner cartridge remaining).

The additional item may be provided, for example, to a party associated with the container (e.g., an employer of a person who opened the container), an owner of the container, a person who opened the container, and/or a destination associated with the container (e.g., an address associated with the container).

In addition to providing additional items, the controller 1500 may determine a rate of usage based on the received indication. For example, the controller 1500 may review indications associated with an employer and determine that employer is using an average of fifty water bottles each week. The controller 1500 may then report the rate of usage to a party associated with the container. The reporting may be performed, for example, periodically (e.g., monthly). The reporting may instead be performed a single time, such as when the rate of usage is less than a minimum pre-determined threshold amount and/or more than a predetermined maximum threshold amount (when more then sixty water bottles are being used each week).

According to one embodiment, the indication received at 802 includes a number of containers that have been opened and/or a number of containers that are remaining. For example, a container may communicate with other containers and transmit a signal indicating how many other containers are present. As another example, a local device 30 may send a message (e.g., an electronic mail message) to the controller 1500 each night indicating how many containers were opened during the day (as opposed to sending a message each time a container is opened).

By way of example, Bob owns a restaurant and purchases ten containers of olive oil. Each time Bob (or one of his employees) opens a container, the container transmits a signal that is received by a food distributor. After the food distributor has received eight indications, another shipment of olive oil is automatically delivered to Bob. Note that in this case, ownership of the olive oil may be transferred to Bob as soon as he receives the olive oil (e.g., he may be billed for the olive oil when it is delivered to his restaurant as opposed to when a container is opened).

Monitoring System Method—Item Quality

Figure 9:
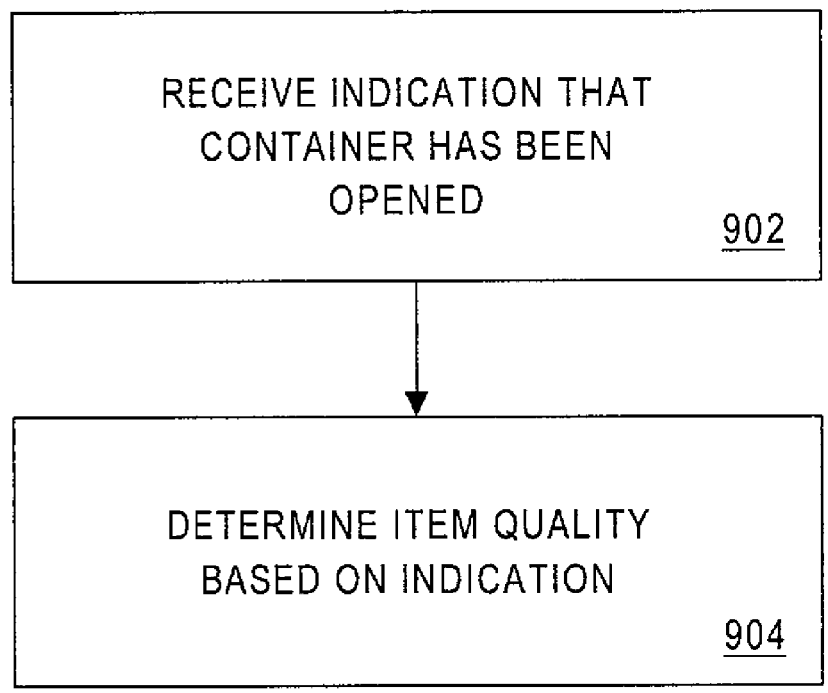
FIG. 9 is a flow chart of a method for determining an item quality according to some embodiments of the present invention.

FIG. 9 is a flow chart of a method for determining an item quality according to some embodiments of the present invention. The method shown in FIG. 9 may be performed, for example, by the controller 1500.

At 902, an indication is received that a container has been opened (e.g., when a person opens the container to access an item). As a result of being opened, the container transmits a signal that is received by the controller 1500. The received indication may include, for example, a container identifier, an item identifier, and/or an item category. Note that the indication may also include any of the other information described with respect to FIG. 7. According to one embodiment, the indication includes a date and/or time associated with the opening of the container. According to another embodiment, a local device 30 or the controller 1500 instead determines the date and/or time based on when the indication is received.

At 904, item quality information is determined based on the received indication. For example, the controller 1500 may determine item quality information based on when the indication was received (e.g., it may be determined that the quality of the item will be unacceptable thirty days after the indication was received). The determination may also be based on, for example, the date the item was created or packaged, the date the item was sold, and/or the date the item was delivered.

According to one embodiment, the controller 1500 also transmits an indication of item quality (e.g., to a party associated with the container, an owner of the container, a person who opened the container, and/or a destination associated with the container). The indication may be transmitted by the controller 1500, for example, periodically (e.g., on a daily basis) or a single time (e.g., when the item quality falls below a pre-determined minimum value).

By way of example, Carol purchases a sealed container of meat from a supermarket on Monday. For health reasons, the supermarket suggests that meat be used before the earlier of: (i) one week after the meat is purchased, and (ii) three days after the sealed container is opened. Carol opens the container on Tuesday—which causes a message to be transmitted to the supermarket. Carol uses half of the meat and places the container into her refrigerator. On Thursday, the supermarket sends a message to Carol (e.g., via a display panel on her refrigerator) reminding her that the meat should not be used after Friday.

Monitoring System Method—Warranty Information

Figure 10:
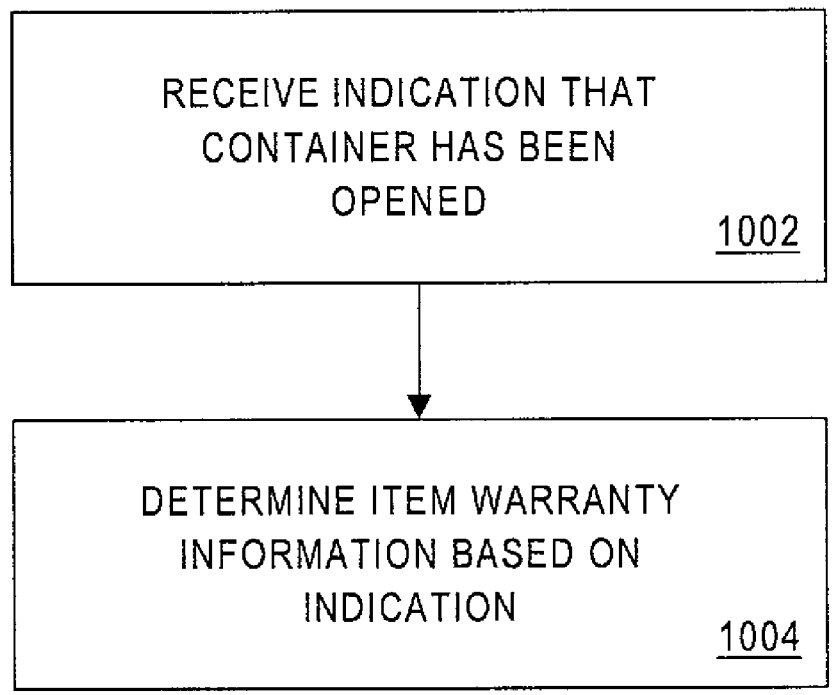
FIG. 10 is a flow chart of a method for determining warranty information according to some embodiments of the present invention.

FIG. 10 is a flow chart of a method for determining warranty information according to some embodiments of the present invention. The method shown in FIG. 10 may be performed, for example, by the controller 1500.

At 1002, an indication is received that a container has been opened (e.g., when a person opens the container to access an item). As a result of being opened, the container transmits a signal that is received by the controller 1500. The received indication may include, for example, a container identifier, an item identifier, and/or an item category. Note that the indication may also include any of the other information described with respect to FIG. 7.

At 1004, item warranty information is determined based on the received indication. For example, the controller 1500 may calculate a warranty expiration date based on the date the container was opened (e.g., by adding ninety days to the date the container was opened). The warranty information may also be associated with, for example, an effective date, a guarantee (e.g., a supermarket may only guarantee that an item will be fresh if the container is opened before a pre-determined date), and/or a return policy (e.g., a person may be allowed to return a gift within seven days of opening the gift).

By way of example, Denise purchases a stereo system with a six-month warranty in January. Because of her busy schedule, however, she does not open the box that contains the stereo system until March. When the box is opened, a signal is received by the stereo system manufacturer, which then determines that Denise's warranty will expire in September (e.g., as opposed to July).

Monitoring System Method—Security Information

Figure 11:
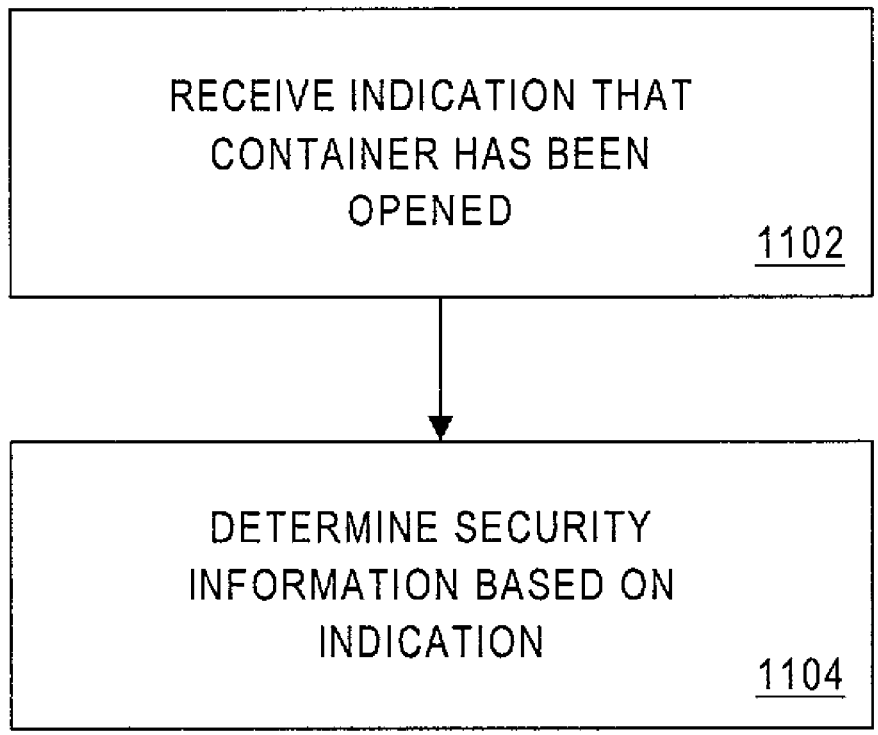
FIG. 11 is a flow chart of a method for determining security information according to some embodiments of the present invention.

FIG. 11 is a flow chart of a method for determining security information according to some embodiments of the present invention. The method shown in FIG. 11 may be performed, for example, by the controller 1500.

At 1102, an indication is received that a container has been opened (e.g., when a person opens the container to access an item). As a result of being opened, the container transmits a signal that is received by the controller 1500. The received indication may include, for example, a container identifier, an item identifier, and/or an item category. Note that the indication may also include any of the other information described with respect to FIG. 7.

At 1104, security information is determined based on the received indication. For example, the controller 1500 may determine if and when the container or an associated item has been tampered with (e.g., such as the date on which the container was opened allowing the item inside to be stolen). According to one embodiment, the security information is associated with an insurance policy (e.g., a postal insurance policy premium may be lowered if an item is shipped via such a container).

By way of example, Eric purchases an a valuable coin via an on-line auction service. When the coin is shipped to Eric, it is placed in an envelope that generates a signal when it is opened. In this way, Eric (or the seller) can be immediately notified if someone tries to open the envelope during shipment (e.g., to remove the coin).

Monitoring System Method—Sender Notification

Figure 12:
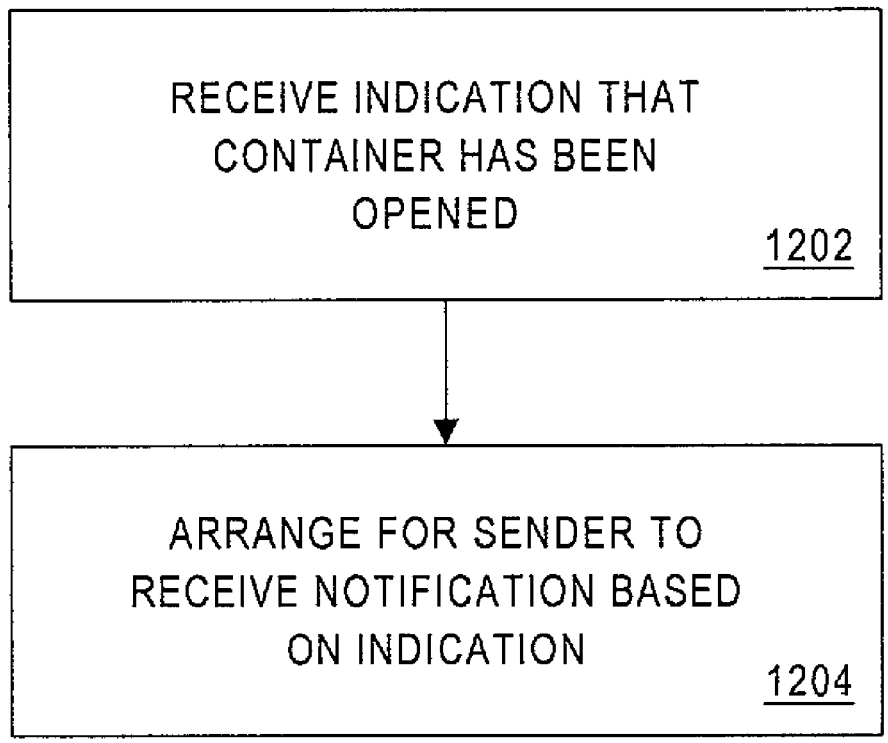
FIG. 12 is a flow chart of a method for notifying a sender according to some embodiments of the present invention.

FIG. 12 is a flow chart of a method for notifying a sender according to some embodiments of the present invention. The method shown in FIG. 12 may be performed, for example, by the controller 1500.

In particular, the method shown in FIG. 12 is associated with a container used to ship an item from a sender to a destination party. At 1202, an indication is received that a container has been opened (e.g., when the destination party opens the container to access the item). As a result of being opened, the container transmits a signal that is received by the controller 1500. The received indication may include, for example, a container identifier, an item identifier, and/or an item category. Note that the indication may also include any of the other information described with respect to FIG. 7.

At 1204, it is arranged for the sender to receive a notification based on the indication. For example, the controller 1500 may transmit an electronic mail message to the sender indicating that the destination party has opened the container. According to another embodiment, the sender may instead access a Web site associated with the controller 1500 to receive this information (e.g., by entering a tracking code via the Web site).

By way of example, Fran sends a package to her friend and tells him that he should not open the package until Friday (his birthday). On Monday, Fran receives an electronic mail message from a delivery service indicating that the package was delivered to her friend. On Friday, she receives another message indicating that the package has been opened.

Similarly, a person can send a legal document to a destination party and verify that the document is not opened until a predetermined event occurs (e.g., by verifying that an envelope containing a will is not opened before a parties death).

Monitoring System Method—Acceptance of Agreement

Figure 13:
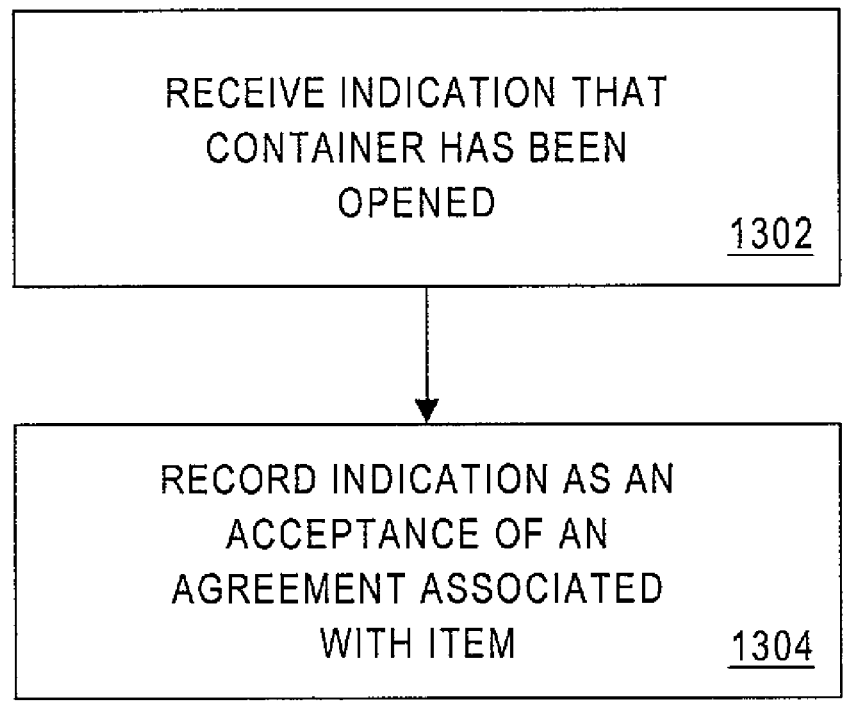
FIG. 13 is a flow chart of a method for recording an indication as an acceptance according to some embodiments of the present invention.

FIG. 13 is a flow chart of a method for recording an indication as an acceptance according to some embodiments of the present invention. The method shown in FIG. 13 may be performed, for example, by the controller 1500.

At 1302, an indication is received that a container has been opened (e.g., when a person opens the container to access an item). As a result of being opened, the container transmits a signal that is received by the controller 1500. The received indication may include, for example, a container identifier, an item identifier, and/or an item category. Note that the indication may also include any of the other information described with respect to FIG. 7. At 1304, the indication is recorded by the controller 1500 as an acceptance of an agreement associated with the item (e.g., as an acceptance of a license to use a software program).

By way of example, Greg purchases a software program from a merchant. He takes the box containing the software program home, and opens the box to find a lengthy license agreement (e.g., containing the legal terms and conditions associated with his use of the software program). The box also contains an envelope that contains a CD-ROM and states "By opening this envelope, I hereby agree to the enclosed software license. Greg opens the envelope (e.g., so that he may install the CD-ROM), which in turn transmits a signal that is received by the software distributor. The signal is then recorded as an indication that Greg accepted the software license.

Monitoring System Method—Item Requirement Verification

Figure 14:
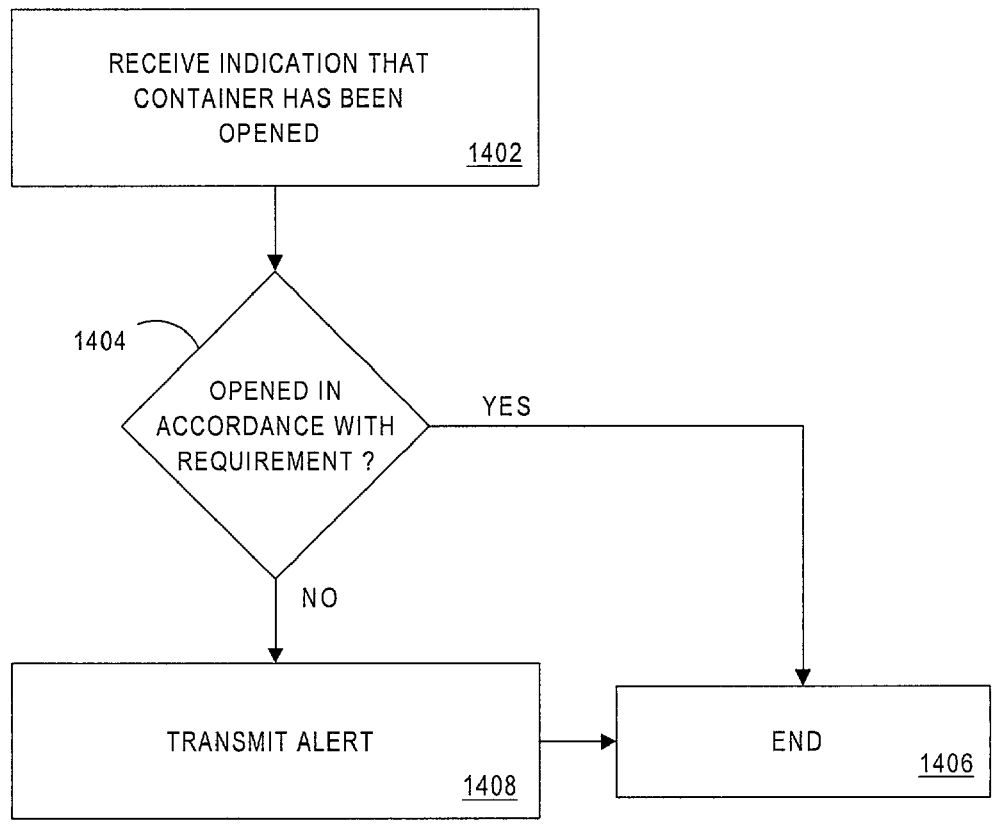
FIG. 14 is a flow chart of a method for verifying compliance with an item requirement according to some embodiments of the present invention.

FIG. 14 is a flow chart of a method for verifying compliance with an item requirement according to some embodiments of the present invention. The method shown in FIG. 14 may be performed, for example, by the controller 1500.

At 1402, an indication is received that a container has been opened (e.g., when a person opens the container to access an item). As a result of being opened, the container transmits a signal that is received by the controller 1500. The received indication may include, for example, a container identifier, an item identifier, and/or an item category. Note that the indication may also include any of the other information described with respect to FIG. 7. According to this embodiment, the indication comprises a signal generated by a transmitting device that does not transmit a signal when the container is subsequently re-opened.

If the container was opened in accordance with an item requirement at 1404 (e.g., indicating that no more than three containers may be opened in a twenty-four hour period), the process ends at 1406. If the container was not opened in accordance with the item requirement, an alert is transmitted at 1408. The alert may be transmitted to, for example, a person who opened the container, a party associated with the item, and/or a third party (e.g., a doctor).

By way of example, Helen receives ten packets of medication (each containing a single pill) associated with a medical treatment program. She is told to take one pill each day for the next ten days. Each time Helen opens a packet, the packet transmits a signal that is received by the controller 1500. When Helen forgets to take a pill on the eighth day of the program (i.e., as indicated by the fact that no packet was opened—and therefore no signal was received by the controller 1500), an alert is transmitted to Helen and her doctor.

Controller

Figure 15:
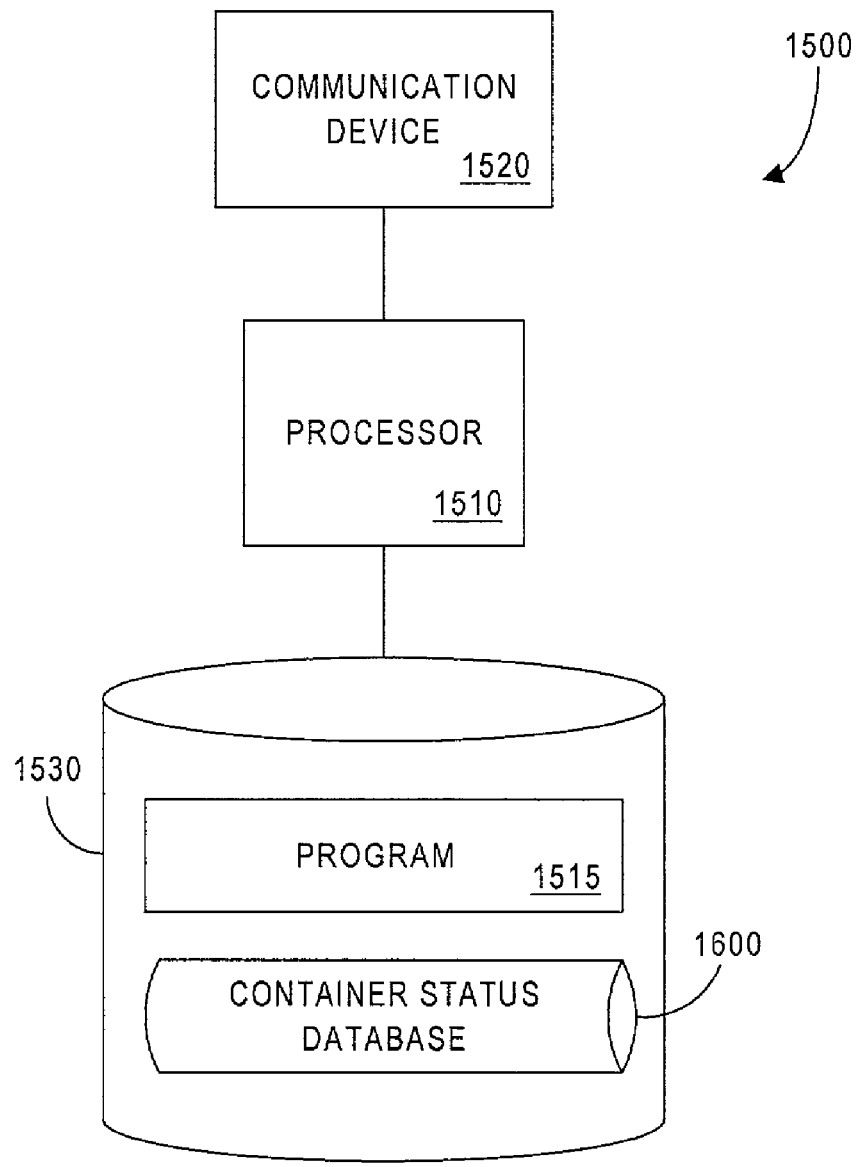
FIG. 15 is a block diagram of a controller according to an embodiment of the present invention.

FIG. 15 illustrates a controller 1500 that is descriptive of the devices shown, for example, in FIGS. 1 and 6 according to some embodiments of the present invention. The controller 1500 comprises a processor 1510, such as one or more INTEL® Pentium® processors, coupled to a communication device 1520 configured to communicate via a communication network (not shown in FIG. 15). The communication device 1520 may be used to communicate, for example, with one or more containers 200, local devices 30, and/or payment devices 40.

The processor 1510 is also in communication with a storage device 1530. The storage device 1530 may comprise any appropriate information storage device, including combinations of magnetic storage devices (e.g., magnetic tape and hard disk drives), optical storage devices, and/or semiconductor memory devices such as Random Access Memory (RAM) devices and Read Only Memory (ROM) devices.

The storage device 1530 stores a program 1515 for controlling the processor 1510. The processor 1510 performs instructions of the program 1515, and thereby operates in accordance with the present invention. For example, the processor 1510 may receive an indication that a container has been opened. The processor 1510 may also arrange for ownership of an item to be transferred and/or for another item to be provided based on the indication.

According to other embodiments, the processor 1510 determines item quality information, item warranty information, and/or security information based on the received indication. According to still other embodiments, the processor 1510 arranges for a sender to receive a notification based on the indication or records the indication as an acceptance of an agreement associated with the item. The processor 1510 may also use the received indication to verify that the container was opened in accordance with an item requirement.

As used herein, information may be "received" by or "transmitted" to, for example: (i) the controller 1500 from a container 200 and/or a local device 30; or (ii) a software application or module within the controller 1500 from another software application, module, or any other source.

Figure 16:
FIG. 16 is a tabular representation of a portion of a container status database according to an embodiment of the present invention.

As shown in FIG. 15, the storage device 1530 also stores a container status database 1600 (described with respect to FIG. 16). According to some embodiments, this database is stored at the controller 1500. According to other embodiments, the database is remotely located and/or distributed. For example, a third-party service may maintain the container status database 1600. An example of a database that may be used in connection with the monitoring systems 100, 600 will now be described in detail. The illustration and accompanying description of the database are exemplary, and any number of other database arrangements could be employed besides those suggested by the figure.

Container Status Database

Referring to FIG. 16, a table represents the container status database 1600 that may be stored at the controller 1500 according to an embodiment of the present invention. The table includes entries identifying containers that are being (or have been) monitored by the monitoring system 100. The table also defines fields 1602, 1604, 1606, 1608 for each of the entries. The fields specify: a container identifier 1602, a party identifier 1604, a status 1606, and a date and time 1608. The information in the container status database 1600 may be created and updated, for example, based on information received from merchants and/or containers.

The container identifier 1602 may be, for example, an alphanumeric code associated with a container that is being (or has been) monitored by the monitoring system 100. The container identifier 1602 may be associated with a particular container or item. The container identifier 1602 may instead be associated with a container or item category (e.g., "EPSON® 101 Toner Cartridge—Black").

The party identifier 1604 may be associated with, for example, a person or a business associated with the container. The party identifier 1604 may be based on, for example, information received from a merchant (e.g., indicating a party who purchased an item) or from a local device 30 (e.g., indicating a party who opened the container).

The status 1606 indicates whether or not a container has been opened (i.e., whether or not the container has transmitted a signal indicating that it has been opened). The date and time 1608 may indicate, for example, a date and time associated with the opening of the container.

The information in the container status database 1600 may be used in connection with any of the embodiments of present invention described herein (e.g., in connection with a transfer of ownership of an item associated with a container). Similarly, any of the information described herein can be stored in the container status database 1600 (e.g., item quality or warranty information).

ADDITIONAL EMBODIMENTS

The following illustrates various additional embodiments of the present invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although many embodiments described herein relate to "when" a container is opened, other embodiments relate to "where" the container was opened. For example, a lottery ticket may transmit a signal when a portion of the lottery ticket is altered by a person (e.g., when a tab is lifted to reveal a number or symbol below the tab). In this case, the controller 1500 may, for example, determine if the person was allowed to use the lottery ticket (e.g., in a particular country or state). According to still other embodiments, the controller 1500 receives a signal when a container is closed or empty, when an item is assembled, or when a container is destroyed or recycled.

Moreover, although many embodiments disclose a container sending information to the controller 1500, according to another embodiment the controller 1500 sends information to the container. For example, the controller 1500 or some other device may transmit information that is stored by the container (e.g., an identifier of a person who purchased an item associated with the container). The container may then include that information in a signal generated when the container is opened.

Note that according to some embodiments, an item may be associated with a container without be enclosed by the container. For example, the item may be a device and the container may be an envelope that contains a password required to operate the device. According to one embodiment, the container is the item (e.g., a piece of luggage may transmit a signal when it is opened).

Also note that that the present invention is applicable to many different types of items. By way of example only, a check book may transmit a signal whenever a check is removed or when the last check in the book is removed (e.g., to reduce fraud). As another example, a video cassette may transmit a signal when the cassette played in a Video Cassette Recorder (VCR), such as by having an internal detecting device trigger a signal when the tape inside the cassette is first moved. In this case, the "container" may actually be inside the item.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed is:

1. A method, comprising:
    arranging for an item owned by a first party to be within a container;
    providing the container and the item to a second party without receiving payment for the item from the second party, wherein the first party remains the owner of the item while the second party has possession of the container and the item;
    receiving a signal indicating that the container has been opened;

verifying that the container was opened in accordance with an item requirement, wherein the item requirement includes a requirement that no more than a selected number of containers, each containing an associated item, have been opened in a selected time period;

transferring ownership of the item to the second party in response to the signal; and arranging for the second party to provide payment for the item in response to the signal.

2. The method of claim 1, further comprising:

transmitting an alert if the container was not opened in accordance with the item requirement.

3. The method of claim 1, wherein the item is associated with a medical treatment program.

4. The method of claim 1, wherein the second party is a person who opened the container, or a party associated with the container.

5. The method of claim 1, wherein the payment is associated with at least one of: (i) a purchase, (ii) a license, (iii) a loan, or (iv) a rental.

6. The method of claim 1, wherein said receiving comprises:

receiving a signal generated by a remote transmitting device.

7. The method of claim 6, wherein the transmitting device does not transmit a signal when the container is subsequently re-opened.

8. The method of claim 6, wherein the transmitting device is associated with at least one of: (i) a radio transmitter; (ii) a photosensitive device, (iii) a pressure sensitive device, (iv) a conductive element attached to an enclosure, (v) a seal having a conductive element, (vi) a seal having a nonconductive element, or (vii) a flexible printed circuit board device.

9. The method of claim 6, wherein said receiving comprises receiving the signal at a controller via a communication device.

10. The method of claim 1, wherein the signal indicating includes at least one of: (i) a party identifier, (ii) an item identifier, (iii) an item category, (iv) a container identifier, (v) a date, (vi) a time, or (vii) location information.

11. The method of claim 1, wherein the signal indicating is received via at least one of: (i) a wireless network, (ii) an Internet protocol network, (iii) a Bluetooth network, or (iv) a cellular network.

12. The method of claim 1, further comprising:

arranging for a second item owned by a first party to be within a second container based on the signal indicating; and providing the second container and the second item to a second party without receiving payment for the item from the second party, wherein the first party remains the owner of the item while the second party has possession of the container and the item based on the signal indicating.

13. The method of claim 1, wherein the item comprises at least one of: (i) a consumer item, (ii) a consumable item, (iii) paper, (iv) toner, (v) energy, (vi) food, (vii) a medical item, (viii) medicine, (ix) disposable contact lenses, (x) a software program, (xi) an entertainment item, (xii) text information, (xiii) audio information, (xiv) image information, (xv) an information storage item, (xvi) a regulated item, or (xvii) a financial item.

14. The method of claim 1, wherein the container comprises at least one of: (i) a package, (ii) a wrapper, (iii) a box, (iv) a bag, (v) a bottle, (vi) a can, (vii) an envelope, (viii) a label, (ix) a tag, or (x) a tie.

* * * * *